(No Model.)
J. P. WHEELER.
STRAW STACKER.
No. 497,149. Patented May 9, 1893.
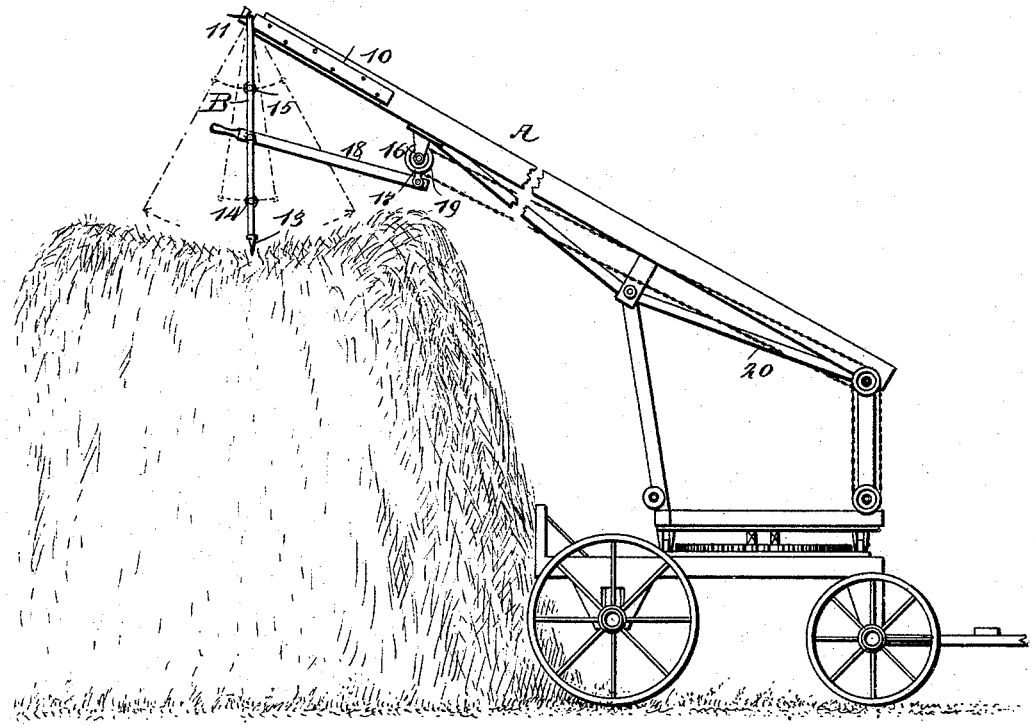
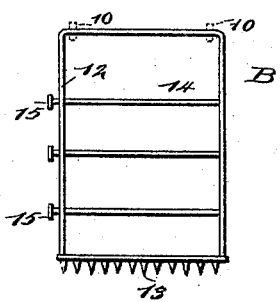
WITNESSES:
INVENTOR
ATTORNEYS.

United States Patent Office.

JOHN P. WHEELER, OF QUINCY, ILLINOIS.

STRAW-STACKER.

SPECIFICATION forming part of Letters Patent No. 497,149, dated May 9, 1893.

Application filed February 1, 1893. Serial No. 460,584. (No model.)

*To all whom it may concern:*

Be it known that I, JOHN P. WHEELER, of Quincy, in the county of Adams and State of Illinois, have invented a new and Improved Distributing Attachment for Straw-Stackers, of which the following is a full, clear, and exact description.

My invention relates to a distributing attachment for straw stackers, and it has for its object to provide an attachment adapted for removable connection with the straw chute of a straw stacker, which attachment may be adjusted to distribute the straw delivered from the straw chute either in an outward direction to trim up the outer sides of the straw stack, or to distribute or scatter the straw around the central portion of the stack, or in any direction within its marginal lines.

Another object of the invention is to provide a means whereby the driving mechanism of the straw stacker is utilized to operate the attachment, and whereby further the attachment may be expeditiously and conveniently adjusted, not only to scatter the straw over a given area of the stack but also vertically in order that the attachment may be operated upon the stack until it is completely filled.

A further object of the invention is to provide a distributing attachment in connection with straw stackers which will automatically distribute the straw and thus dispense with manual labor.

To that end the invention consists in the novel construction and combination of the several parts, as will be hereinafter fully set forth and pointed out in the claims.

Reference is to be had to the accompanying drawings forming a part of this specification, in which similar figures and letters of reference indicate corresponding parts in all the views.

Figure 1 is a side elevation of the straw stacker, illustrating the invention as applied thereto and the manner in which the attachment operates; and Fig. 2 is a detail view of the rake section of the attachment.

In carrying out the invention two bracket arms 10, are employed, one being attached to each side of the straw chute A of the straw stacker at the upper end thereof, the bracket arms extending beyond the upper or outer ends of the chute, as shown in Fig. 1; and each bracket arm at its outer or projecting end is provided with a socket 11 produced therein. The removable portion of the attachment comprises a rake B, shown in detail in Fig. 2. The rake B, preferably comprises a skeleton frame 12, somewhat rectangular in cross section, the lower member of the frame being provided with and adapted to carry rake teeth 13, and a series of cross bars 14, extending transversely across the frame and into its side members, the cross bars being arranged at intervals apart, preferably rake intervals. One end of each cross bar extends beyond a side of the frame, and the projecting end of each cross bar is provided with a head 15. The frame B, is adapted to be carried by the bracket arms 10, and to that end the frame is fitted in the sockets 11 of the said bracket arms, enabling the rake to be swung as a pendulum below the delivery end of the straw chute.

Beneath the straw chute, preferably between its center and outer or upper end, a shaft 16, is journaled, which shaft is provided at one end with a crank arm 17, the said crank arm being connected with a pitman 18; and the pitman near its outer or rear end is provided with a recess, the said recess being adapted to fit over the projecting end of any predetermined cross bar 14 of the rake head, the head 15 of the bar preventing the pitman from leaving the same as shown in Fig. 1; and as the pitman is to be shifted at times from one bar to the other, the rear end of the pitman may be formed with a handle. The shaft 16, is provided with a driving pulley 19, and this pulley is connected by a belt 20 with any driving or driven pulley upon the straw stacker.

In operation, the rake frame is hung from the bracket arms 10 by its upper member or cross bar when the stack is first to be formed, and even after it has been built upward to some extent. The pitman 18 is then connected with the upper cross bar 14, and when this connection is made the rake frame will have its farthest or greatest throw, as shown in the outer dotted lines in Fig. 1; and as the straw is delivered over the upper end of the stacker, the rake frame will be laterally reciprocated, and the straw will be carried from the center of the stack to the outer face thereof, and an attendant may be there stationed to trim up the outer side and give proper shape to the stack. After the sides have been trimmed upward, the pitman may be disconnected from the upper cross bar and connected with the central one for example; its throw will now be limited to some extent, and the straw will be scattered or distributed between the center and the edge of the stack, while when the pitman is connected with the lower cross bar of the rake frame the throw of the latter will be decidedly limited, as shown by the inner dotted lines in Fig. 1, and the straw will be scattered and distributed over the central portion of the stack.

When the straw chute is elevated the attachment is carried up with it; and after the straw chute has been elevated to its highest position and it is still desired to carry the stack upward, the rake frame may be carried upward by using any one of the cross bars 14 to pivot the frame upon the bracket arms 10.

The utility of such a device is apparent, and it is evident that the straw may be automatically distributed in such manner as to virtually trim or shape the stack, and that with the attendance of but one man.

Having thus described my invention, I claim as new and desire to secure by Letters Patent—

1. The combination, with the straw chute of a straw stacker, of a vibrating distributing rake pivotally suspended from its delivery end, and a driving connection between the driving mechanism of the chute and the rake for imparting a regular vibratory movement thereto, as and for the purpose set forth.

2. The combination, with the delivery or straw chute of a straw stacker, of a distributing rake pivotally supported at the delivery end of the chute and having pendulum movement beneath it, a driven shaft, and a pitman connected with the driven shaft and adjustably connected with the rake, as and for the purpose specified.

3. The combination, with the straw chute of a straw stacker, of a rake carrying frame adjustably and pivotally suspended from the delivery end of the chute, a shaft provided with a crank arm, a driving mechanism for the crank, substantially as shown and described, and a pitman having a crank connection with the shaft and an adjustable connection with the rake carrying frame, whereby the frame may be raised or lowered independently of the chute and the throw of the rake frame be limited, as and for the purpose set forth.

4. The combination, with the straw chute of a straw stacker, of a rake carrying frame provided with a series of cross bars extending beyond the sides of the frame, the frame having pivotal connection with the straw chute at its delivery end through the medium of its upper edge or one of the cross bars, a drive shaft, a driving mechanism connected with said shaft, and a pitman having crank connection with the shaft and a removable connection with the cross bars of the frame, as and for the purpose set forth.

JOHN P. WHEELER.

Witnesses:
L. E. EMMONS,
L. E. EMMONS, Jr.